(12) United States Patent
Manning et al.

(10) Patent No.: US 10,855,152 B2
(45) Date of Patent: Dec. 1, 2020

(54) METHOD AND SYSTEM FOR MANUFACTURE OF A COMPRESSED COIL

(71) Applicant: University of Newcastle Upon Tyne, Newcastle upon Tyne (GB)

(72) Inventors: Christopher David Manning, Newcastle upon Tyne (GB); James Widmer, Newcastle upon Tyne (GB); Richard Martin, Newcastle upon Tyne (GB)

(73) Assignee: Advanced Electric Machines Group Limited, Washington (GB)

( * ) Notice: Subject to any disclaimer, the term of this patent is extended or adjusted under 35 U.S.C. 154(b) by 389 days.

(21) Appl. No.: 15/515,532

(22) PCT Filed: Sep. 30, 2015

(86) PCT No.: PCT/GB2015/052861
§ 371 (c)(1),
(2) Date: Mar. 29, 2017

(87) PCT Pub. No.: WO2016/051175
PCT Pub. Date: Apr. 7, 2016

(65) Prior Publication Data
US 2017/0222523 A1     Aug. 3, 2017

(30) Foreign Application Priority Data
Oct. 1, 2014  (GB) .................................. 1417355.3

(51) Int. Cl.
*H01F 7/06*    (2006.01)
*H02K 15/04*   (2006.01)
(Continued)

(52) U.S. Cl.
CPC ....... *H02K 15/0435* (2013.01); *H01F 41/098* (2016.01); *H02K 15/0068* (2013.01);
(Continued)

(58) Field of Classification Search
CPC ........... H02K 15/0435; H02K 2213/12; H02K 15/0068; H02K 2203/12; H01F 41/098;
(Continued)

(56) References Cited

U.S. PATENT DOCUMENTS 2,913,640 A * 11/1959 Edgarton ................ H01F 37/00
336/192
4,988,055 A *  1/1991 Sakai ........................ H01F 5/02
242/159
(Continued)

FOREIGN PATENT DOCUMENTS

CN         1241790 A      1/2000
CN         2433723 Y      6/2001
(Continued)

OTHER PUBLICATIONS

Office Action from the State Intellectual Property Office of China, for Chinese Patent Application No. 201580054038.X, dated Jun. 12, 2018, 9 pages.
(Continued)

*Primary Examiner* — Donghai D Nguyen
(74) *Attorney, Agent, or Firm* — Klarquist Sparkman, LLP

(57) ABSTRACT

A method of manufacturing a compressed coil and a system for holding a wire during the manufacture of a compressed coil are disclosed. The method includes providing a wire including a first lead section, a central section and a second lead section. The central section of the wire is wound around a bobbin to form a coil. A punch top is located over an end of the bobbin such that the end of the bobbin is located at least partially within a through-hole of the punch top. A second lead section of the wire is located within a groove in an outer surface of the punch top or bobbin and pressure is applied to the bobbin and/or punch top to compress the coil.

24 Claims, 8 Drawing Sheets

(51) Int. Cl.
*H01F 41/098* (2016.01)
*H02K 15/00* (2006.01)

(52) U.S. Cl.
CPC ..... *H02K 2203/12* (2013.01); *H02K 2213/12* (2013.01); *Y10T 29/49071* (2015.01)

(58) Field of Classification Search
CPC .......... Y10T 29/4907; Y10T 29/49073; Y10T 29/532; Y10T 29/49071
USPC .................................. 29/605, 606, 745, 596
See application file for complete search history.

(56) References Cited

U.S. PATENT DOCUMENTS

| | | | | |
|---|---|---|---|---|
| 5,912,609 | A * | 6/1999 | Usui | H01F 27/292 336/192 |
| 6,598,824 | B2 * | 7/2003 | Schmidt | B65H 75/14 242/118.41 |
| 6,747,538 | B2 * | 6/2004 | Kuwata | H01F 17/045 336/192 |
| 2003/0127933 | A1 | 7/2003 | Enomoto et al. | |
| 2004/0183639 | A1 | 9/2004 | Okura et al. | |
| 2008/0290979 | A1 | 11/2008 | Suzuki et al. | |
| 2010/0013588 | A1 | 1/2010 | Sakuma | |
| 2010/0253456 | A1 * | 10/2010 | Yan | H01F 27/306 29/606 |
| 2011/0115594 | A1 | 5/2011 | Yen | |

FOREIGN PATENT DOCUMENTS

| | | |
|---|---|---|
| CN | 103489623 A | 1/2014 |
| EP | 2463990 A2 | 6/2012 |
| JP | 10172822 A | 6/1996 |
| JP | H10172822 A | 6/1998 |
| JP | 2001-203120 | 7/2001 |
| JP | 2008-147265 A | 6/2008 |
| WO | WO2012/127603 A1 | 9/2012 |

OTHER PUBLICATIONS

International Search Report and Written Opinion of the International Searching Authority, dated Dec. 17, 2015, for corresponding International Application No. PCT/GB2015/052861, 15 pages.

Examination Report from the United Kingdom Intellectual Property Office for corresponding United Kingdom Application No. GB1517302.4, dated Feb. 27, 2018, 4 pages.

Rule 94(3) EPC Communication issued in European Patent Application No. 15782010.1, dated Jun. 11, 2019, 6 pages.

Office Action (including English translation) issued in Japanese Patent Application No. 2017-517672, dated May 21, 2019, 14 pages.

Examination Report from the Intellectual Property Office India for corresponding Indian Patent Application No. 201717015146, dated Apr. 3, 2020, 6 pages.

* cited by examiner

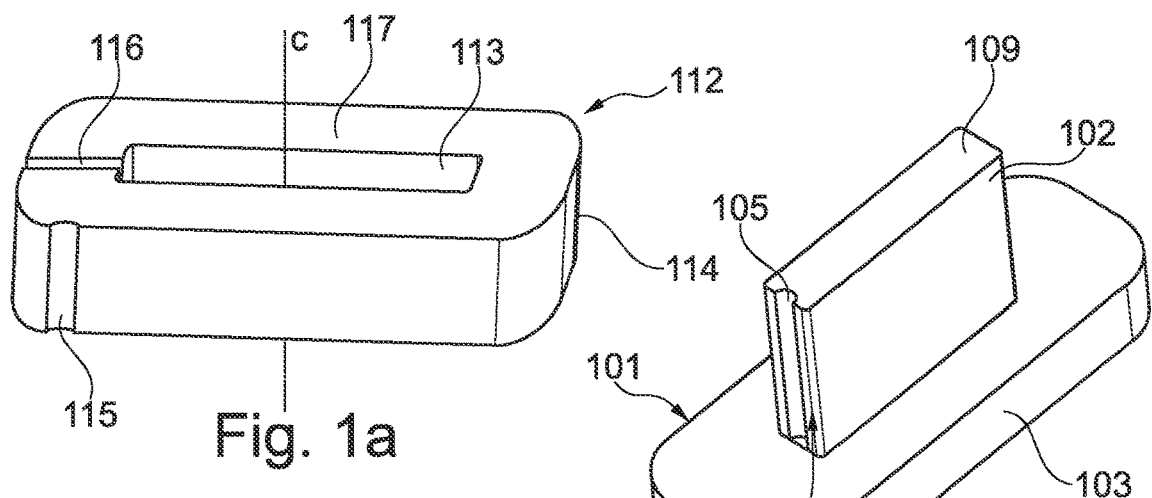
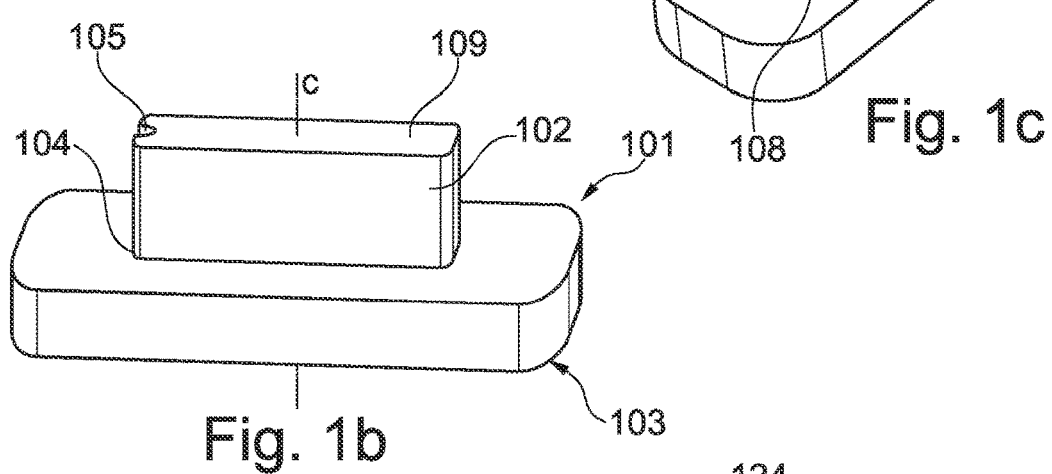
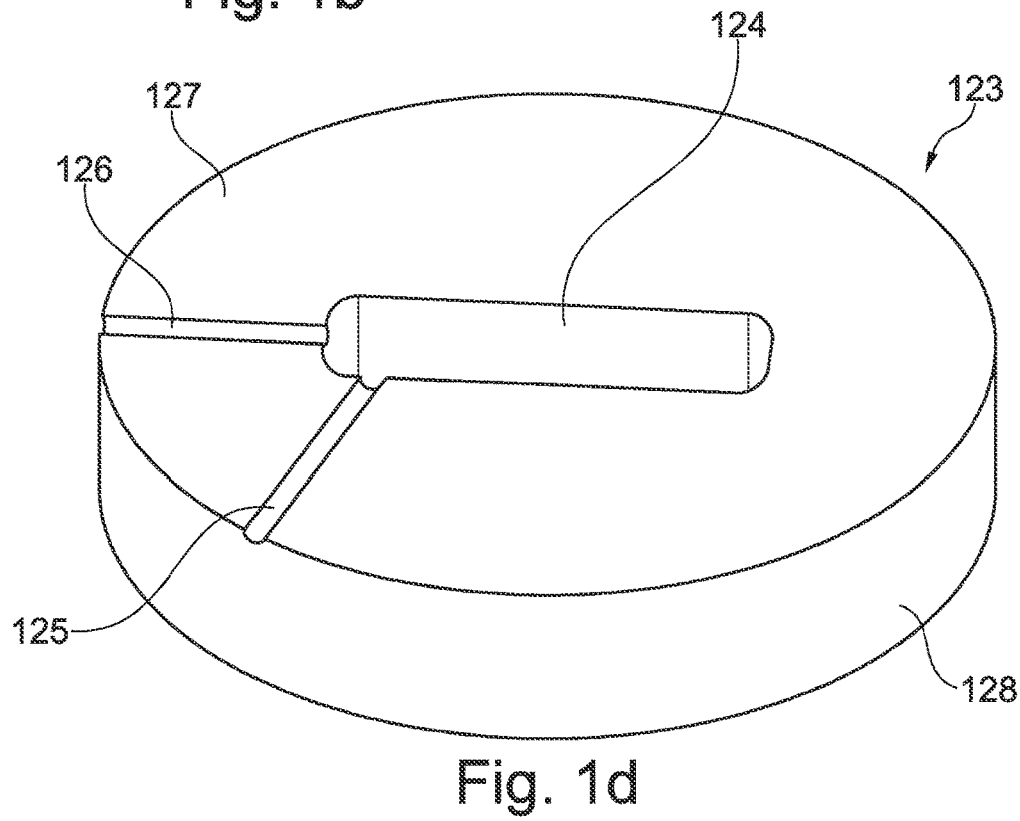

METHOD AND SYSTEM FOR MANUFACTURE OF A COMPRESSED COIL

CROSS REFERENCE TO RELATED APPLICATIONS

This is the U.S. National Stage of International Application No. PCT/GB2015/052861, filed Sep. 30, 2015, which in turn claims the benefit of and priority to United Kingdom Application No. GB1417355.3, filed Oct. 1, 2014.

BACKGROUND

The present invention relates to a method and system for manufacture of a compressed coil. In particular, but not exclusively, the present invention relates to a method of compressing a coil whilst preserving the integrity of the coil terminations.

There is an increasing demand in the automotive and aerospace industry for high power density electrical machines. Such machines usually operate at high current densities and high speeds.

The performance of modern high power density electrical machines is often limited by a combination of high loss density and thermal resistance between motor windings and coolant. It is possible to address some of these limitations by improving the fill factor in motor windings.

Compressed coils can produce a higher fill factor compared to conventionally wound coils. The gross fill factor is defined as the ratio of the conducting cross-sectional area of a wound electrical coil to the amount of available cross-sectional area in the slot (winding area) of an electrical machine. For example, a typical electrical machine wound with wire of circular cross-section, will have gaps between adjacent windings resulting in a fill factor of approximately 35% to 65%. Compressing the coil reduces the gaps between adjacent windings and therefore allows a larger cross section of conductor to be used, increasing the fill factor of the coil. This increased cross-sectional area of each winding conductor, leads to a reduction in electrical resistance and thereby reduced DC winding losses. Compressed coils will also have lower thermal resistance across the coils, due to the reduction in the voids between individual conductors, enabling more efficient heat transfer from motor winding to motor coolant.

Compressed coils are currently manufactured from single strand wire (usually copper or aluminium). In high speed electrical machines, higher electrical frequencies induce more significant AC losses in larger diameter conductors due to skin and proximity effects in the wires. Larger AC losses lead to reduced efficiency and increased operating temperature. Since electrical machines can only operate up to a certain temperature limit, the latter reduces the acceptable electrical loading and therefore reduces motor performance.

Using a twisted array of stranded wires (litz wire) in place of a single conductor reduces or mitigates the skin and proximity effects noted above. This is because decreasing the individual conductor diameter mitigates the skin effect whilst twisting the conductors equalizes the magnetic field experienced by each strand and so the strand currents and thus avoids undesirable current loops and concentrations. A stranded wire therefore does not experience the same increase in AC resistance as a solid conductor of the same cross-sectional area.

However, current compressed coil manufacturing techniques may not suitable for stranded or litz wires because they damage the coil terminations, particularly during the compression of the coil, or where coil leads are not handled with care during the winding or compression process.

An example of a compressed coil manufacturing process can be seen in U.S. Pat. No. 3,348,183.

SUMMARY

According to a first aspect of the present invention there is provided a method of manufacturing a compressed coil, the method comprising:
  providing a wire comprising a first lead section, a central section and a second lead section;
  winding the central section of the wire around the bobbin to form a coil;
  locating a punch top over an end of the bobbin such that the end of the bobbin is located at least partially within a through-hole or recess of the punch top;
  locating at least one of the lead sections of the wire within a groove in a surface of the punch top or bobbin; and
  applying pressure to the bobbin and/or punch top to compress the coil.

The method may comprise locating the second lead section of the wire within a groove, which may be in a surface, e.g. an outer surface, of the punch top or bobbin.

According to a second aspect of the present invention there is provided a method of manufacturing a compressed coil, the method comprising:
  providing a wire comprising a first lead section, a central section and a second lead section;
  winding the central section of the wire around the bobbin to form a coil;
  locating a punch top over an end of the bobbin such that the end of the bobbin is located at least partially within a through-hole of the punch top;
  locating the second lead section of the wire within a groove in an outer surface of the punch top; and
  applying pressure to the bobbin and/or punch top to compress the coil.

The method may comprise placing the first lead section against or adjacent the bobbin, for example prior to winding the central section of the wire around the bobbin, e.g. such that the second lead section is outermost, for example after the central section of the wire is wound around the bobbin.

The method may comprise or involve locating one or more of the bobbin, coil and punch top within a die, for example before the step of applying pressure to the bobbin and/or punch top. In other embodiments, the method comprises or involves applying pressure to the bobbin and/or punch top in the absence of a die.

The method may comprise winding the central section of the wire such that, e.g. in a configuration such that, the first and second lead sections of the wire can exit the bobbin and/or the punch top. The first lead section of the wire may be located in a groove of the bobbin. The bobbin may comprise a spindle, and a flange at a first end of the spindle. The method may comprise winding the central section of the coil around the or a spindle of the bobbin. The end of the bobbin located at least partially within the through-hole or recess of the punch top may comprise a second end of the spindle.

The groove of the bobbin may extend longitudinally or may comprise a longitudinal groove, which may be in an outer surface of the spindle. The groove of the bobbin may extend from an inner edge of the flange, e.g. adjacent the first end of the spindle, to an outer edge of the flange. Additionally or alternatively, the groove of the bobbin may extend longitudinally along an outer surface of the flange, for example from the outer edge of the flange. In embodiments, the groove of the bobbin extends from an inner edge of the flange adjacent the first end of the spindle to an outer edge of the flange and then longitudinally along an outer surface of the flange.

The method may comprise locating the first lead section of the wire, or a portion thereof, within a groove in a surface, e.g. a surface of the through-hole or recess, of the punch top. The method may comprise locating a portion of the first and second lead sections of the wire within respective grooves in one or more surfaces of the die. The die may comprise two co-operating portions, which may be configured to be joined or secured together to accommodate the bobbin, coil and punch top. The method may comprise locating at least one insert between the coil and the punch top and/or between the coil and the flange.

The method may comprise winding the central section of the wire around the bobbin such that the coil comprises one or multiple layers of windings. The method may comprise winding the central section of the wire in a configuration to minimise void areas between windings. The multiple layers of windings may comprise one or more of an innermost layer, e.g. adjacent the spindle, a second layer, e.g. provided adjacent the innermost layer, and one or more subsequent layers, one or more of which may be provided adjacent the second and/or subsequent layer. Each winding of each of the second and subsequent layers may be wound offset from each winding of adjacent layers. The wire may be single strand. stranded wire or litz wire.

Another aspect of the invention provides a coil, e.g. a compressed coil, obtained by the method described above.

According to another aspect of the present invention there is provided a system suitable for holding a wire during the manufacture of a compressed coil, the system comprising:
 a bobbin for holding a wound wire; and
 a punch top comprising a through-hole or recess, the through-hole or recess having a cross-section sized and shaped to accommodate at least a portion of an end of the bobbin,
 wherein at least one of the bobbin and punch top comprises a groove in a surface thereof for accommodating a lead section of the wire.

The punch top may comprise a groove, which may be in a surface, e.g. an outer surface, thereof.

According to yet another aspect of the present invention there is provided a system suitable for holding a wire during the manufacture of a compressed coil, the system comprising:
 a bobbin for holding a wound wire; and
 a punch top comprising a through-hole, the through-hole having a cross-section sized and shaped to accommodate at least a portion of an end of the bobbin; and
 a groove in an outer surface of the punch top or bobbin for accommodating a lead section of the wire.

The bobbin may comprise a spindle and/or a flange, which flange may be at a first end of the spindle. The bobbin and/or the spindle may comprise a longitudinal axis, for example about which the coil is wound. The flange may extend laterally from the spindle, for example orthogonally or in a direction perpendicular to the longitudinal direction. The flange may comprise a larger periphery, e.g. lateral periphery, than the spindle. The bobbin, spindle and/or flange may comprise any suitable cross-sectional shape, for example circular, round, elliptical, square, rectangular or any polygonal shape.

The spindle and the flange may comprise discrete and/or separable parts. In embodiments, the flange may comprise an aperture, hole, recess or depression, for example for receiving the spindle or within which it is received. In embodiments, the flange is omitted. In other embodiments, the flange and the punch top comprise the same or similar dimensions, for example each may comprise the same periphery and/or an aperture, hole, recess or depression having the same or substantially the same or similar size and/or shape and/or dimensions to one another.

The groove may be located in an outer surface of the spindle or of the flange. In embodiments, the bobbin comprises a groove extending laterally along the flange, for example from an inner edge, which may be adjacent the spindle or an end thereof, to an outer edge of the flange. The groove may extend longitudinally along an outer surface of the flange. In embodiments, the bobbin comprises a groove extending laterally along the flange from an inner edge to an outer edge thereof and then longitudinally along an outer surface thereof.

The punch top may comprise a groove in a surface thereof, or in a surface of the through-hole, for accommodating a lead section of the wire.

The system may comprise a die, which may have a through-hole that is preferably sized and shaped to accommodate the bobbin and punch top. The die may further comprise two grooves, e.g. extending along a surface of the die, for accommodating or to accommodate the lead sections of the wire. The die may comprise two co-operating portions configured to be joined together to accommodate the bobbin, coil and punch top.

Another aspect of the invention provide a bobbin, e.g. for holding a wound wire and/or for use in the aforementioned system or method, the bobbin comprising a groove in a surface thereof for accommodating a lead section of the wire. The groove may be on an outer surface of the bobbin and/or may extend longitudinally therealong or along a spindle thereof and/or may extend laterally therealong or along a flange thereof.

Yet another aspect of the invention provides a punch top, e.g. for use in the aforementioned system or method, the punch top comprising a through-hole or recess having a cross-section sized and/or shaped for accommodating or to accommodate at least a portion of an end of a bobbin, wherein the punch top comprises a groove in a surface thereof for accommodating a lead section of a wire. The groove may be on an outer surface, for example a peripheral outer surface, of the punch top, e.g. for accommodating, in use, a lead section of a wire between the punch top and a die surrounding the punch top. The groove may be on a surface of the through-hole or recess for accommodating, in use, a lead section of a wire between the punch top and a bobbin received in the through-hole or recess.

Another aspect of the invention provides a computer program element comprising and/or describing and/or defining a three-dimensional design for use with a three-dimensional printing means or printer or additive manufacturing means or device, the three-dimensional design comprising an embodiment of the bobbin or spindle or flange or punch top described above.

For the avoidance of doubt, any of the features described herein apply equally to any aspect of the invention. For example, the system or any of the components thereof may comprise any one or more features of the method relevant thereto and/or the method may comprise any one or more features or steps relevant to one or more features of the system or one or more components thereof.

Certain embodiments provide the advantage that a method is provided for manufacturing a compressed coil in which damage to the lead sections of a wire (the wire terminations) is reduced or eliminated compared with known manufacturing techniques.

As used herein, the term 'lead section' is used to define a region of a wire that, after winding, becomes the lead (or wire termination) of a coil, i.e. the region of the wire at an end of the wire. The term 'central section' is used to define a region of a wire in the centre of the wire that, after winding, becomes the coiled section.

Certain embodiments provide the advantage that a system is provided for holding a wire during manufacture of a compressed coil, in which damage to lead sections of the wire is reduced or eliminated compared with known manufacturing techniques.

Certain embodiments provide the advantage that when using a coil manufactured by the above method, the torque density of an electrical machine can be improved by around 30% when compared with electrical machines having conventional known coils.

Certain embodiments provide the advantage that compressed coils can be manufactured with a fill factor of up to 99.5% in terms of conductor area (including conductor insulating enamel) to total coil cross-sectional area; this equates to a gross fill factor typically of 75% or greater. This may be achieved even where slots would not typically lend themselves to achievement of a high fill factor with standard bobbin windings.

Certain embodiments provide the advantage that Litz wire or stranded wire can be used in a compressed coil.

BRIEF DESCRIPTION OF THE DRAWINGS

Embodiments of the invention are further described hereinafter with reference to the accompanying drawings, in which:

FIGS. 1a, 1b, 1c and 1d respectively illustrate a punch top, a bobbin, another view of the bobbin and a die;

In the drawings like reference numerals refer to like parts.

DETAILED DESCRIPTION

Figure 2:
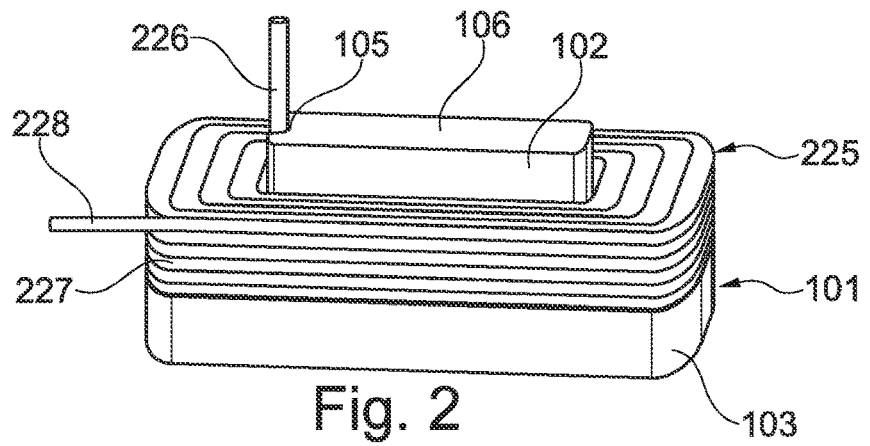
FIG. 2 illustrates a bobbin with a wire wound about the bobbin.

FIGS. 1a, 1b, 1c and 1d respectively illustrate an example of a punch top, a bobbin, the bobbin of FIG. 1c from another perspective, and a die used during a method of manufacturing a compressed coil.

In this example, the bobbin 101 includes a central portion (a spindle) 102 and a flange 103 located at a first end 104 of the spindle 102 (as shown in FIGS. 1b and 1c). The spindle 102 has a substantially rectangular cross-sectional shape and is of suitable length for a wire to be wound around the spindle to form a coil. The bobbin is formed from high strength tool steel material in this example.

The flange 103 has a cross-sectional shape larger than the cross-sectional shape of the spindle 102. In use, the flange 103 is of suitable dimensions and shape to prevent a wound wire from slipping off the first end 104 of the spindle 102. The dimensions and shape of the flange 103 may also or alternatively correspond to the desired shape of the surface of the compressed coil. In this example the flange has a substantially rectangular cross-section with rounded corners; though it will be appreciated that many cross-sectional shapes would be suitable.

The bobbin also includes a groove 105. In this example the groove 105 extends along an outer surface of the spindle 102. The groove extends substantially longitudinally from the first end 104 of the spindle 102 to a further end (second end) 106 of the spindle 102. The groove 105 is sized and shaped to receive a lead section of a wire.

In this example, the groove 105 is located within an edge region 108 of the spindle. However it will be appreciated that the groove 105 can be located within any other suitable region of the spindle 102.

FIG. 1a illustrates a punch top 112. In this example the punch top is made from high strength tool steel. The punch top 112 has a cross-sectional size and shape substantially the same as the cross-sectional size and shape of the flange 103 of the bobbin 101. The punch top may also be sized and shaped to correspond to the desired shape of the surface of the compressed coil.

In addition, the punch top 112 includes a through-hole 113. The through-hole 113 extends all the way through the punch top 112 along a central axis C. The cross-sectional size and shape of the through-hole 113 are substantially equal to or greater than the cross-sectional size and shape of the spindle 102, such that the spindle 102 can be located at least partially within the through-hole 113. That is, the through-hole 113 is sized and shaped so that the punch top 112 may partially or completely encompass the spindle 102.

Aptly, the cross-sectional size and shape of the through-hole 113 are substantially equal to or marginally greater than the cross-sectional size and shape of the spindle 102, such that the spindle can be located securely within the through-hole 113.

The punch top 112 includes a groove 115 located in an outer surface 114 of the punch top. The groove 115 is sized and shaped to accommodate another lead section of a wire. In this example the groove 115 extends substantially longitudinally along the length of the punch top 112, i.e. parallel to a central longitudinal axis C of the punch top or bobbin.

A further groove 116 is provided in a surface of the punch top 112. The further groove 116 is positioned in a face surface 117 of the punch top 112 i.e. perpendicular to the central longitudinal axis C of the punch top or bobbin. The groove 116 extends along the face surface 117 from the through-hole 113 to the outer surface edge 114. The groove is provided such that the end of the groove at the through-hole 113 aligns with the groove 105 of the bobbin 101 when the punch top 112 is located over the end 109 of the bobbin 101.

FIG. 1d illustrates a die 123 that can optionally be used in conjunction with the bobbin 101 and punch top 112. The die is made from high strength tool steel in this example.

The die 123 has a cross-sectional size and shape larger than the cross-sectional size and shape of the flange 103 and the punch top 112. The die is sized and shaped to contain, without deforming, the high compression forces inherent in the coil manufacturing process. A through-hole 124 extends through the die 123 and is sized and shaped to accommodate both the bobbin 101 and the punch top 112. As such, the through-hole 124 of the die has a cross-sectional size and shape substantially equal to or greater than the cross-sectional size and shape of the punch top 112 and the bobbin 101.

Optionally the die includes grooves 125, 126 extending along a surface 127 of the die to accommodate the lead sections of the wire. The grooves 125, 126 extend from the through-hole 124 to an outer surface edge 128 of the die 123. The grooves are positioned such that the ends of the grooves at the through-hole 124 are aligned with respective grooves 115, 116 of the punch top 112 when the punch top is located within the die.

During manufacture of a compressed coil, a wire 225 is wound around the bobbin (as shown in FIG. 2). In this example, the wire 225 is a single stranded wire including a conductor wire and an insulating layer around the conductor wire.

A first lead section 226 of the wire 225 is located in the groove 105 of the bobbin. The wire 225 is located within the groove 105 such that a portion of the first lead section of the wire 225 protrudes beyond a second end 106 of the spindle 102.

A central section 227 of the wire is then wound around the bobbin 101 to form a coil. In this case, the central section 227 is wound around the spindle 102.

Aptly, the central section 227 of the wire 225 is wound around the spindle multiple times such that the coil includes multiple layers of windings (turns).

Figure 3:
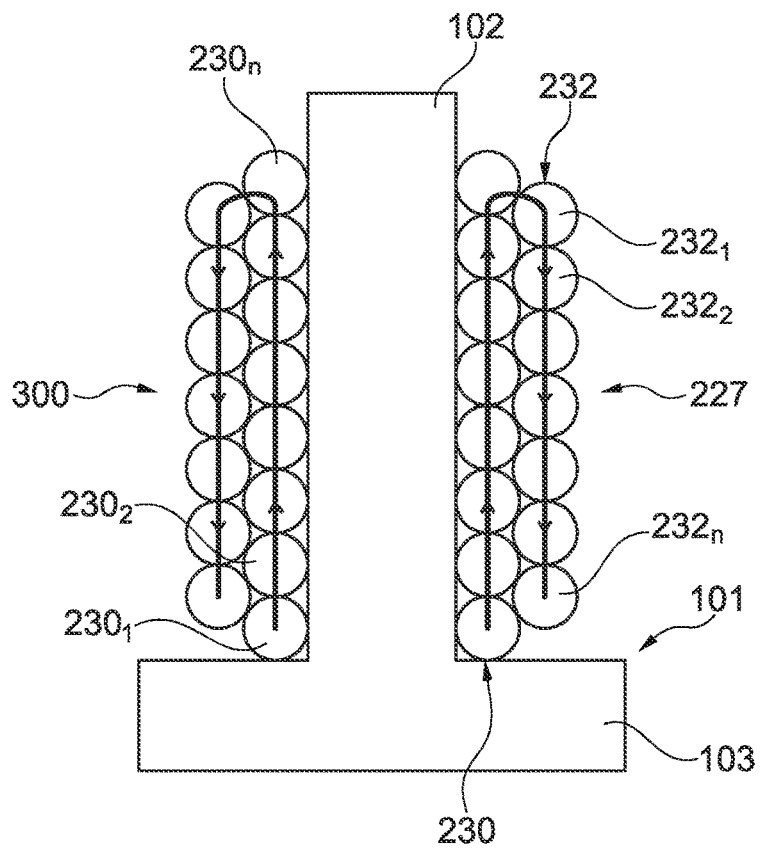
FIG. 3 illustrates a sectional view of a wound coil.

FIG. 3 is a sectional view of a bobbin 101 including a wound wire 300 and illustrates an example including two layers of windings wound from the central section 227 of the wire. The first (innermost) layer of windings 230 includes a number of windings $230_{1-n}$ extending adjacent to each other and along the length of and adjacent the spindle 102.

A second layer 232 is provided adjacent to the innermost layer 230. Each winding $232_{1-n}$ of the second layer 232 is wound to be offset from each winding $230_{n-1}$ of the innermost layer 230. In other words, the first layer 230 is wound, starting for example at the first end 104 of the spindle 102 adjacent to the flange 103. Each single winding $230_{1-n}$ is provided adjacent to the previous single winding to avoid or minimise gaps between successive windings. The final winding of the layer is provided close to the second end 106 of the spindle 102. The wire is then wound in the reverse direction (i.e. back towards the flange) to form the second layer 232 of windings. Each single winding in the second layer 232 is positioned between adjacent single windings of the first layer 230. A leading edge of a single winding in the second layer is offset by 50% from a leading edge of an adjacent single winding in the first layer. The windings are added in the order shown by the arrows in FIG. 3.

Additional layers of windings may be provided in a similar manner such that each of the second and subsequent layers of windings are wound offset from each winding of an adjacent layer.

The skilled person will appreciate the number of winding turns and number of layers of windings required in the coil can be selected, depending on the intended use of the final product. For example, a coil used in a typical motor may have 50 winding turns and 3 to 5 layers of windings in order to produce the required power output. In another example a coil may have less than 5 winding turns and be arranged in a single layer or otherwise. In another example a coil may have greater than 100 winding turns.

It will also be appreciated that the size and shape of the punch top and bobbin can be selected depending on the size of coil required.

Optionally, a winding guide (formed from e.g. plastic) may be fitted over the second end 106 of the spindle 102 during the winding process. The winding guide can help prevent the wire from slipping off the end of the spindle during the winding process. Once the coil has been wound onto the spindle, the winding guide can be removed from the spindle.

Figure 4:
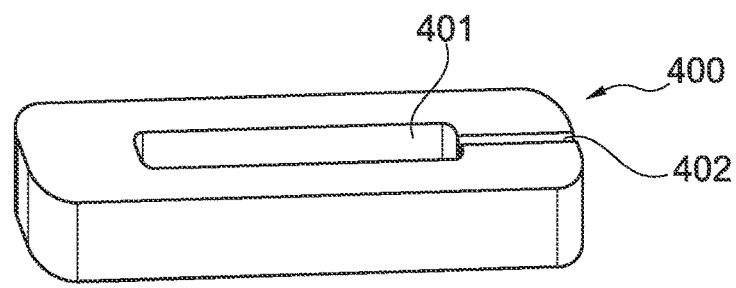
FIG. 4 illustrates a winding guide.

An example of a winding guide is illustrated in FIG. 4. In this example, the winding guide 400 is substantially the same shape as the punch top. The guide includes a recess 401 sized and shaped to receive a portion of the second end 106 of the spindle 102. The guide 400 also includes an opening 402 configured to receive the first lead section 226 of the wire 225 during the winding process.

Once the coil 225 has been wound onto the spindle (and any winding guide removed), the punch top 112 is located over the bobbin 101 such that the end of the bobbin is located at least partially within the through-hole 113 of the punch top 112.

Figure 5:
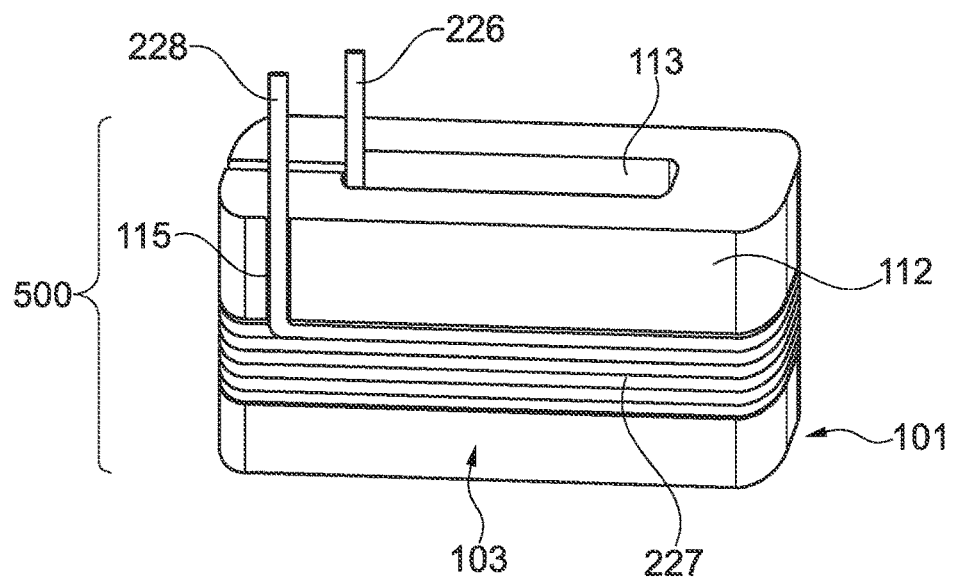
FIG. 5 illustrates a bobbin, wound wire and punch assembly.

In this example, the punch top 112 is located over the second end 106 of the spindle such that a portion of the spindle is located in the through-hole 113 of the punch top 112 (see FIG. 5). The first lead section 226 of the wire is passed through the through-hole 113 such that a portion protrudes from the punch top 112.

The second lead section 228 of the wire is then located in the outer surface groove 115 of the punch top. Aptly, a portion of the second lead section 228 protrudes beyond the punch top as shown in FIG. 5.

Figure 6:
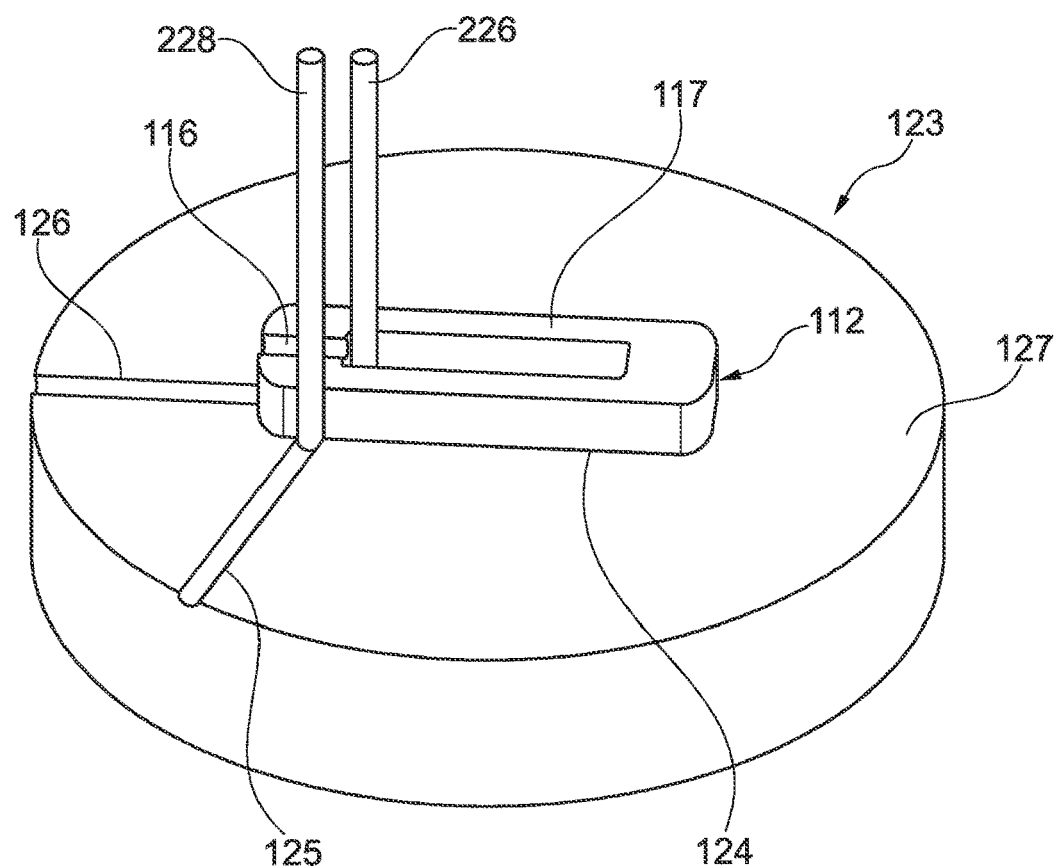
FIG. 6 illustrates a bobbin, wound wire, punch and die assembly.

The bobbin, coil and punch top assembly 500 is then located within the die 123 as illustrated in FIG. 6.

The through-hole 124 of the die 123 is substantially the same size and shape as the punch top 112 and the flange 103 of the bobbin, such that any gap between the assembly 500 and an inner surface of the through-hole 124 is minimized. This helps to prevent the coil from bulging outwardly during compression. This also helps to ensure that for manufacturing of multiple coils over a period of time using the same bobbin, punch-top and die, the finished compressed coils will have a uniform shape every time.

Care should be taken to ensure that the second lead section 228 of the wire remains in the groove 115 when the assembly 500 is being inserted into the die so the region 228 remains in the groove 115 during the compression stage (described later). Otherwise, if the second lead section 228 becomes dislodged from the groove 115 it may be damaged during compression.

At this stage, i.e. after insertion in the die and before compression, the punch top will extend beyond the surface 127 of the die, and some of the coil may be visible (not shown).

Pressure is then applied to the punch top, without compressing the lead sections 226, 228 of the wire. At this stage, a low pressure is applied (e.g. up to 50 MPa). The low pressure is applied until the wire is fully located within the die.

The pressure applied to the punch top is then increased. For example, the pressure is increased to between approximately 70 MPa to 100 MPa. After applying the greater pressure, the punch top 112 should be located further within the through-hole 124 of the die 123, though some of the punch top will still extend beyond the surface 127 of the die 123.

The first lead section 226 of the wire is located in the grooves 116, 126 and the second lead section 228 of the wire is located in the groove 125. A steadily increasing pressure is then applied to the punch top (i.e. pressure increasing at an approximately constant rate). At this stage the pressure applied may be up to about 450 MPa. As the coil windings are compressed, the punch top will move further into the through-hole of the die.

Once the face surface 117 of the punch top is level with the surface 127 of the die, the compression is complete.

Aptly, the final pressure applied to the punch top is maintained for a period of time to reduce the coil spring back. Aptly the period is approximately 60 seconds. The pressure may optionally be maintained for more or less time depending on the properties of the coil. Optionally the pressure may be released and reapplied for a further period of time. This can be repeated as necessary.

The pressure may be applied to the punch top using an appropriate press or compression tool as is well known in the art.

Aptly the surface of the compression tool or press contacting the punch top during compression is a flat or substantially flat surface, to ensure an even distribution of pressure across the coil.

The surface of the compression tool or press contacting the punch top in the final stage of compression (i.e. after the lead sections of the wire have been located in their respective grooves 126,125), is larger than the cross-sectional area of the punch top. This helps to ensure that the coil is not over-compressed, because compression of the coil will cease as soon as the surface applying pressure also contacts the die. This helps to ensure that the apparatus can produce identical coils every time it is used.

The grooves 125, 126 and 116 prevent the lead sections of the wire from being crushed or damaged during compression.

After compression, the assembly 500 is removed from the die 123. This can be done in a number of ways as will be appreciated by those skilled in the art.

For example, the die may be placed in a press with a gap beneath the bobbin. The bobbin can then be pushed from the die by pressing on the spindle with a suitably shaped pushing piece. The lead sections 226, 228 of the wire can then be straightened to avoid damage, before pushing out the compressed coil and punch top in a suitable manner. The punch top can then be carefully removed from the coil, without damaging the lead sections of the wire.

Figure 7A:
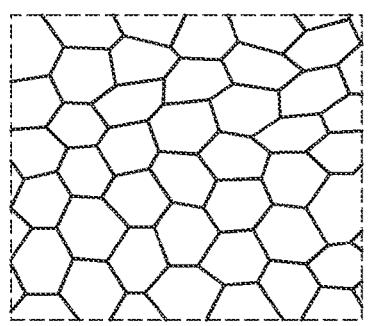
FIGS. 7a and 7b illustrate a sectional view of compressed single strand or stranded coil and an uncompressed stranded wire respectively.
Figure 7B:
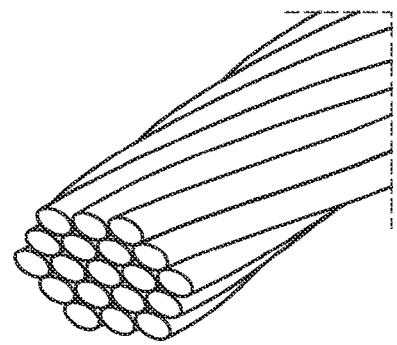

FIG. 7*a* shows a portion of an enlarged sectional view of compressed windings. FIG. 7*b* illustrates an uncompressed litz wire (stranded wire). As shown in FIG. 7*a* the compressed single stranded wire adopts a generally hexagonal cross-section during compression and void space between windings is minimised. The uncompressed litz wire shown in FIG. 7*b* will also compress as shown in FIG. 7*a*, with each strand taking on a form with hexagonal cross-section.

Figure 8:
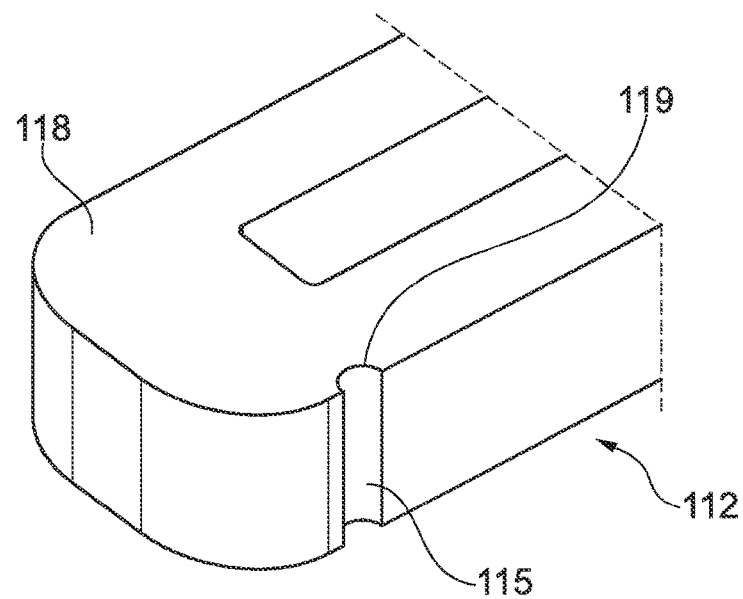
FIG. 8 illustrates a punch top.

FIG. 8 illustrates the punch top 112 in an orientation with an inner face surface 118 of the punch top 112 facing upwards. The inner face surface 118 is the surface against which the coil is compressed during compression. The groove 115 in the outer surface of the punch top creates a void into which the coil can bulge and deform during compression. This void can cause localised insulation failure of the wire. Therefore, the void space should aptly be minimised.

When the second lead section 228 of the wire is located within the groove 115, it contacts the edge 119 of the groove 115. As such, during compression, the second lead section of the wire is also compressed against the edge 119.

Figure 9:
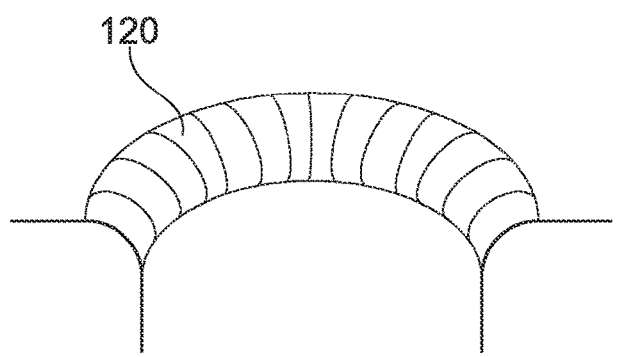
FIG. 9 and FIG. 10 illustrate an end of a groove.
Figure 10:
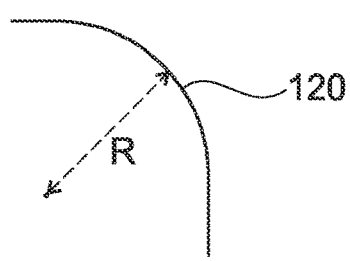
Figure 11:
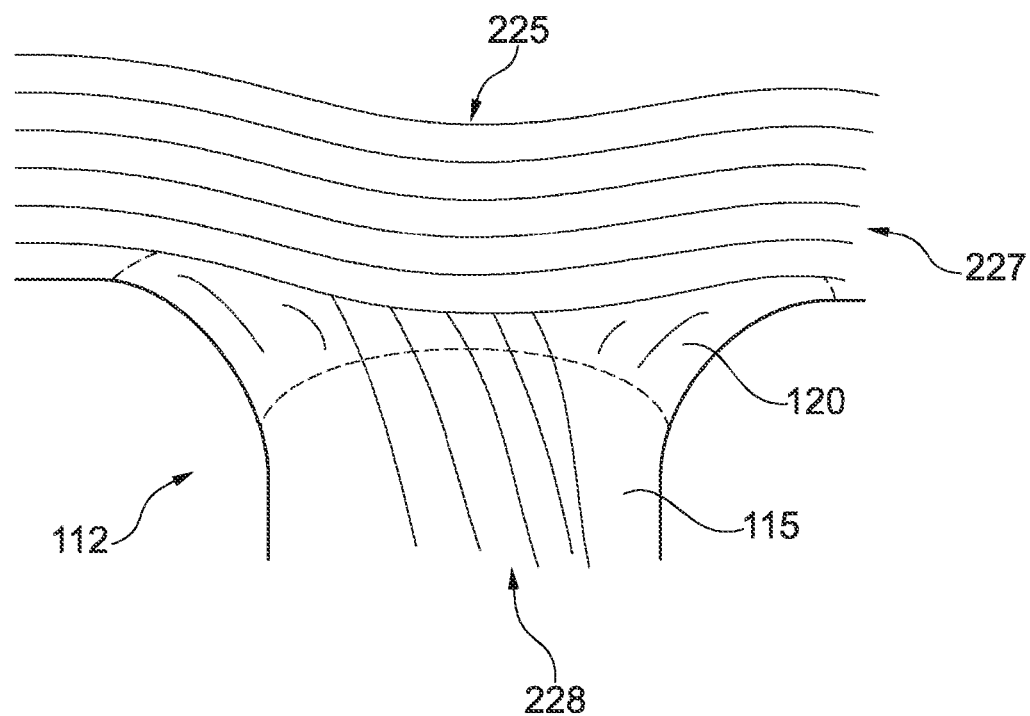
FIG. 11 illustrates an end of a groove with a wound wire.

FIGS. 9 to 11 illustrate how the groove in the outer surface of the punch top may be rounded (filleted) at an end. In one embodiment, the edge 119 is rounded to form a smooth surface against which the second lead section of the wire can be bent. This is illustrated in more detail in FIGS. 9 and 10. This rounding or filleting removes the otherwise sharp edges. Such sharp edges might cut into the coil. The rounding is however appropriately limited so as to avoid a large void such that compression of the wire may cause the coil to bulge into the void.

The edge 119 is rounded to form a smooth surface 120 with a predetermined radius of curvature R. The radius of curvature R is selected such that it is large enough to protect and prevent damage to the lead section of the wire during compression, yet small enough to prevent the coil from bulging into the void.

FIG. 11 illustrates how the coil may bulge into the void, if the radius of curvature R of the smooth surface 120 is too large or the groove 115 is too large for the wire. Bulging of the coil into the void can deform the final shape of the coil and will cause irregularities in the compressed windings and ultimately will lead to damage of the winding insulation and therefore affect the performance and reliability of the final coil. This example shows the groove 115 on the outer surface edge of the punch top 112. The edge of the groove has been rounded to form a smooth surface 120. The central section 227 of the wire has been wound to form a coil 225 and the second lead section 228 of the wire is located within the groove. As can be seen, in this example the wire is a stranded wire. The coil 225 has been compressed and the central section 227 of the wire in the vicinity of the groove 115 has bulged into the void created by the groove 115. The bulging of the central section 227 of the wire has also compressed the lead section 228 of the wire against the smooth surface 120. This can ultimately damage the lead sections of the wire resulting in electrical insulation failure or severed conductors.

The radius of curvature R is therefore selected according to the specific requirements of the wire being used to form the coil. Aptly, the radius of curvature R is selected such that it is equal to the minimum allowable bend radius for the wire used to form the coil. For example, for a wire of 1 mm diameter the radius of curvature R of the smooth surface 120 is between approximately 3 mm and 6 mm. Of course, the skilled person will readily be able to select the most appropriate radius of curvature depending on the size of wire used and the size of the coil that is required.

It will be appreciated that rounded edges, as described above in relation to FIGS. 9 to 11, can be applied to any edge of any groove in the punch top 112, bobbin 101, or die 123.

Figure 12:
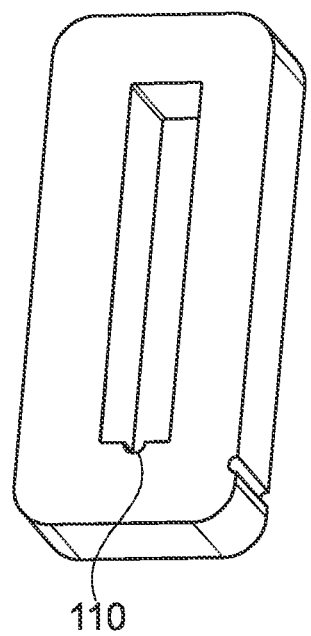
FIG. 12 illustrates another punch top.

Various modifications to the detailed designs as described above are possible. For example, rather than providing a groove 105 in the bobbin as described above, a groove 110 may instead be provided in the punch top as illustrated in FIG. 12. The groove is located on an inner surface of the through-hole and is sized and shaped to receive the first lead section 226 of the wire. The remaining features of the punch top may be substantially the same as those described above in relation to FIG. 1a and for brevity will not be described again in detail. Similarly, the method steps for manufacturing a compressed coil in this example would be substantially the same as those described above except the first lead section 226 of the wire will be located in the groove 110 in the punch top rather than in a groove in the bobbin.

Figure 14:
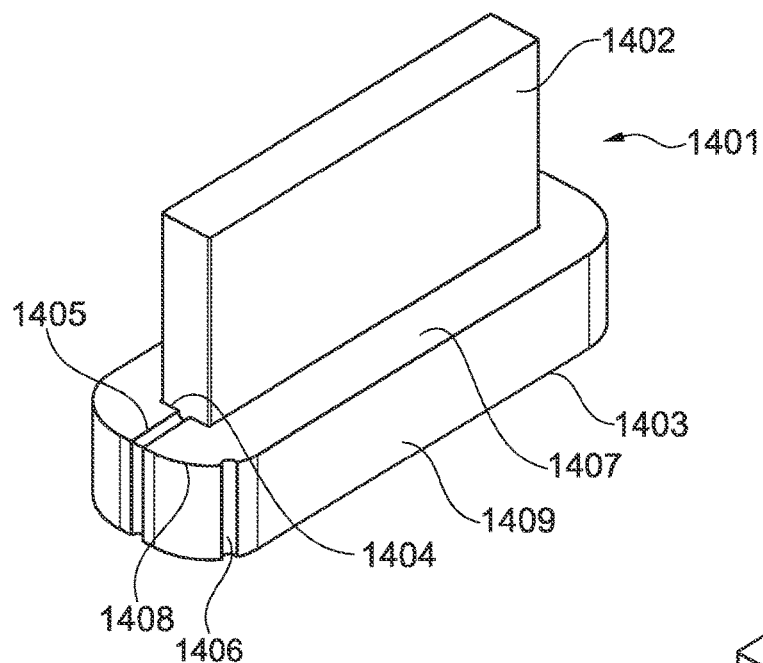
FIG. 14 illustrates an alternative bobbin.

In an alternative embodiment, one or more lead sections of the wire may be located in grooves on the bobbin as shown in FIG. 14. The bobbin 1401 is substantially the same as the bobbin 101 described in relation to FIG. 1b but instead of having a groove 105 in the spindle, the bobbin 1401 includes two grooves 1405, 1406 located in the flange 1403. The first groove 1405 extends along a face surface 1407 of the flange 1403 from a first end 1404 of the spindle 1402 to an outer edge 1408 of the flange 1403. The groove 1405 also extends substantially longitudinally along an outer surface 1409 of the flange 1403 i.e. parallel to a central longitudinal axis of the bobbin 1401.

The flange 1407 also includes a further groove 1406 located in the outer surface 1409 of the flange 1401. The further groove 1406 also extends substantially longitudinally along an outer surface 1409 of the flange 1403.

The groove 1405 and further groove 1406 are each sized and shaped to accommodate first and second lead sections of a wire respectively.

Figure 15:
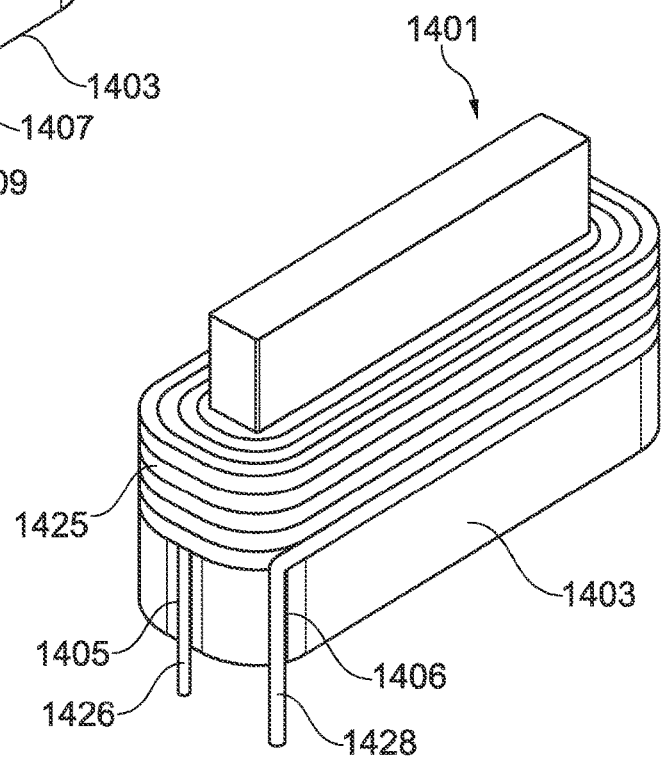
FIG. 15 illustrates the bobbin of FIG. 14 with a wound wire.

Manufacture of a coil using the bobbin 1402 is similar to that described in relation to FIGS. 2 to 6 except that in this case the first lead section 1426 of the wire is located in the groove 1405 of the bobbin 1401 prior to winding the central section of the wire and the second lead section 1428 of the wire is located in the further groove 1406 of the bobbin after winding. FIG. 15 shows the bobbin 1401 with a wound wire 1425. The first lead section 1426 is located in the groove 1405 and the second lead section 1406 is located in the further groove 1428.

Figure 16:
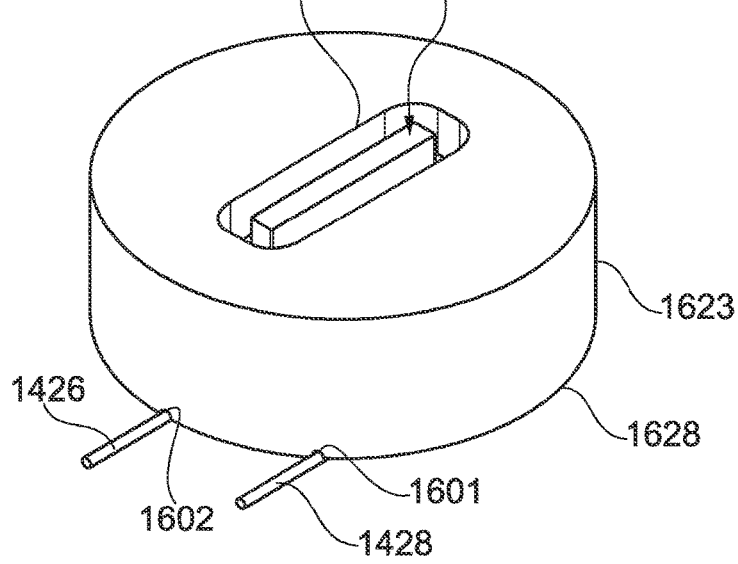
FIG. 16 illustrates the bobbin and wound wire of FIG. 15 inserted in a die.

The wound wire 1425 and bobbin 1401 may be inserted into a die 1623 as shown in FIG. 16. In this example, the die 1623 is substantially the same as the die 123 described in relation to FIG. 1d, except that grooves are located in a bottom surface of the die rather than a top surface of the die.

Similarly to the grooves described in FIG. 1d, the grooves 1601, 1602, 126 extend along a surface of the die to accommodate the lead sections of the wire. The grooves 125, 126 extend from the through-hole 1624 to an outer surface edge 128 of the die 1623. The grooves are positioned such that the ends of the grooves at the through-hole 1624 are aligned with respective grooves 1405, 1406 of the bobbin 1401 when the bobbin is located within the die 1623.

Prior to or after inserting the bobbin and coil in the die, a punch top similar to that described in FIG. 1a may be located over the spindle 1402 of the bobbin 1401. The whole assembly can then be compressed in a similar manner to that described above.

It will be appreciated that in this case the punch top may not require any grooves as the lead sections of the wire are instead accommodated in grooves in the bobbin. However, in some embodiments one lead section may be accommodated in a groove within the bobbin and the other lead section may be accommodated within a groove in the punch top.

Figure 17:
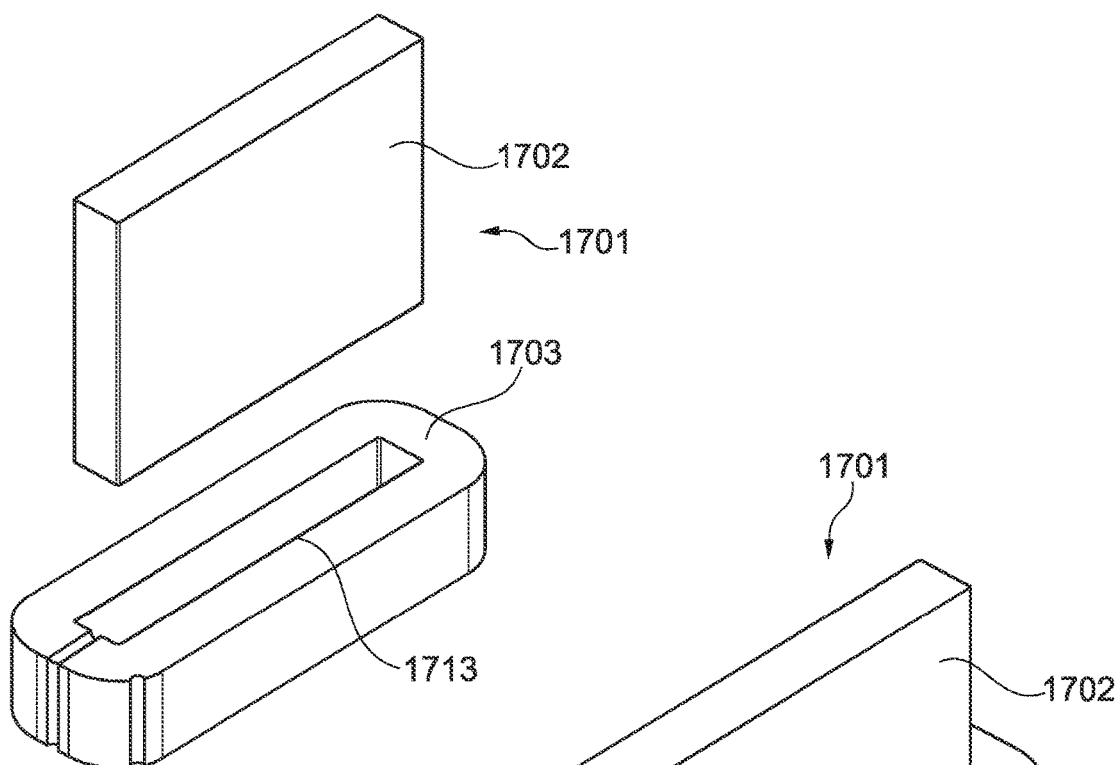
FIG. 17 illustrates another alternative bobbin.
Figure 18:
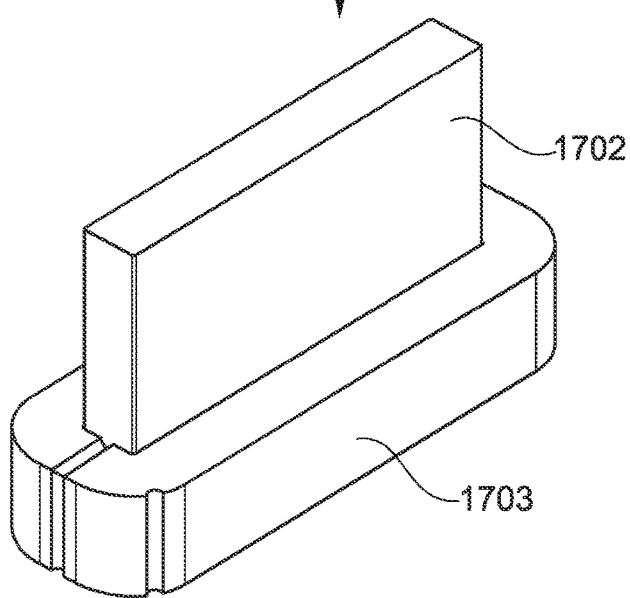
FIG. 18 illustrates the bobbin of FIG. 17 in an assembled configuration.

FIGS. 17 to 18 illustrate an alternative bobbin 1701. As described before in relation to FIGS. 1c and 14, the bobbin 1701 includes a flange 1703 and spindle 1702. However, in this example the flange 1703 and the spindle 1702 are separable, discrete parts.

The flange 1703 is similar to the punch top 112 described in relation to FIG. 1a and includes a through-hole 1713. The through-hole 1713 extends all the way through the flange 1703 along a central axis. The cross-sectional size and shape of the through-hole 1713 are substantially equal to or greater than the cross-sectional size and shape of the spindle 1702, such that the spindle 1702 can be located at least partially within the through-hole 1713. That is, the through-hole 1713 is sized and shaped so that the flange 1703 may partially or completely encompass the spindle 102.

Figure 19:
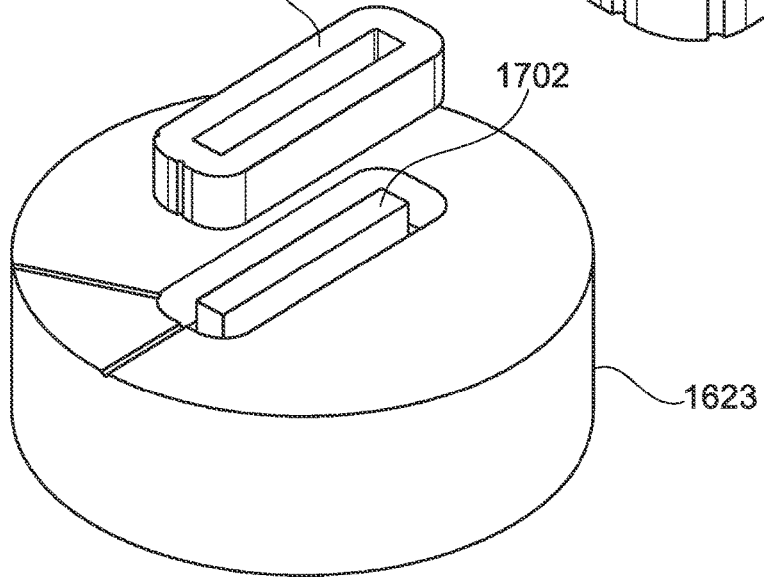
FIG. 19 illustrates the bobbin of FIGS. 17 and 18 inserted in a die.

The flange 1703 may be located over an end of the spindle 1702 in a similar manner to the punch top described in FIG. 1a. As such, the flange 1703 may act as a punch top. FIG. 19 illustrates a die 1623 having a punch top (not shown), spindle 1702 and wound wire (not shown) inserted therein. The flange 1703 can be placed onto the spindle 1702 in a similar manner to the punch top as shown in FIG. 5 and a compressive force may be applied to the flange 1703.

Alternatively the hole 1713 may extend only partially through the flange 1703 to form a recess. An end of the spindle can be located in the recess to form the assembled bobbin 1701. The bobbin 1701 can then be used in the same manner described in relation to FIGS. 2 to 6 in conjunction with a punch top or the recess may comprise a depth that permits a predetermined degree of compression. The flange 1703 and spindle 1702 may remain separable or may be joined or otherwise secured together by any suitable means before, during or after winding.

It is also envisaged that the flange 1703 is omitted, for example wherein the bobbin 1701 includes only a spindle 1702 and a punch top (not shown) having a similar or identical configuration to the flange 1703.

Although the method described above uses a die, it will be appreciated that a compressed coil can be manufactured without using the die. For example, pressure may be applied directly to a face surface of the punch top and/or to the flange of the bobbin.

In one embodiment, the groove 105 in the bobbin 101 may extend along the full length of the spindle such that it forms a channel into which the first lead section of the wire can be located.

Figure 13:
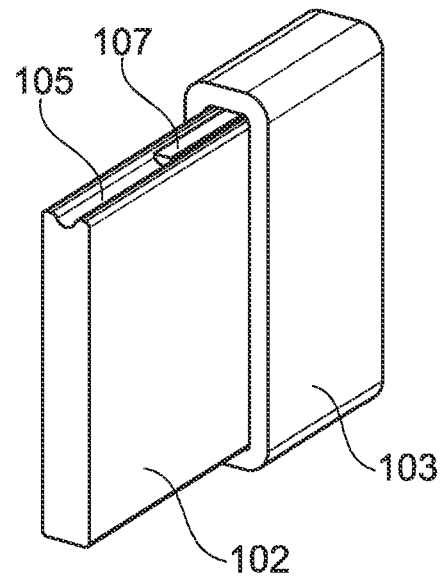
FIG. 13 illustrates another bobbin.

In an alternative embodiment the groove may only extend along a portion of the length of the spindle. This is illustrated in more detail in FIG. 13. In this example, the groove 105 extends along a portion of the length of the spindle 102 furthest from the flange 103. During compression, part of the first lead section 226 of the wire is compressed against a flat portion 107, whilst the remaining part of the lead section is uncompressed because it is located within the groove 105. The flat portion helps to prevent damage to the lead section of the wire in the region where the wire transitions from a compressed state to an uncompressed state, after compression of the coil.

Optionally, before inserting the assembly 500 into the die, tape may be applied to the wound coil to protect the windings and hold them in position whilst the assembly is inserted into the die. A suitable tape can be selected by those skilled in the art (e.g. Kapton tape).

To help insert the assembly 500 into the die, a lubricant may optionally be applied to the outer surface of the coil (and optionally tape) prior to inserting the assembly 500 into the die.

Figure 20:
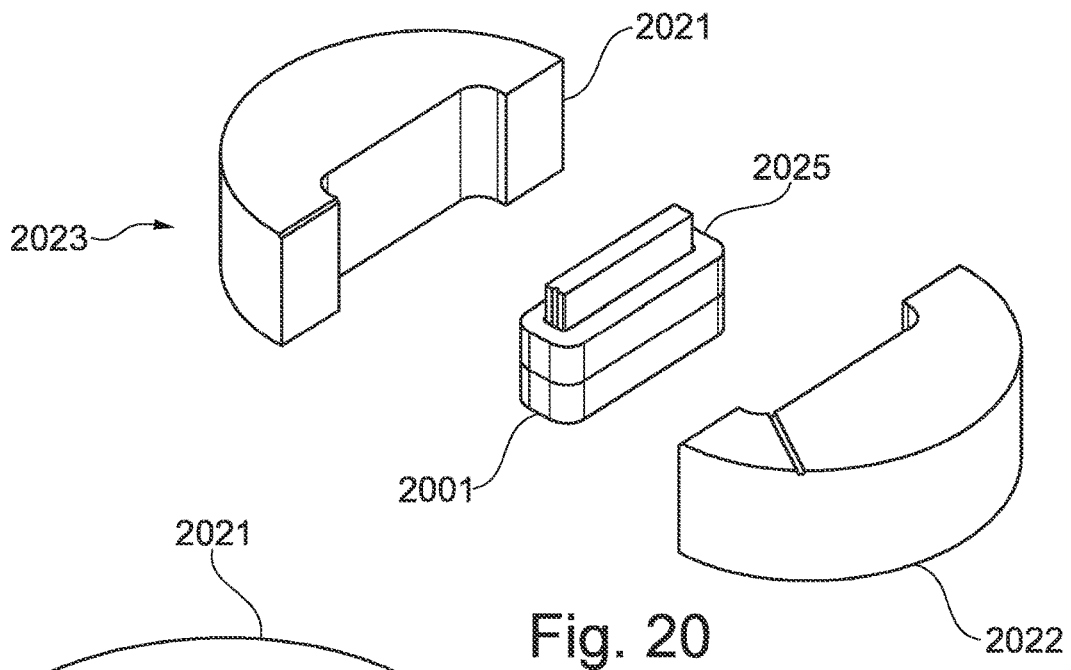
FIGS. 20 to 22 illustrate an alternative die.
Figure 21:
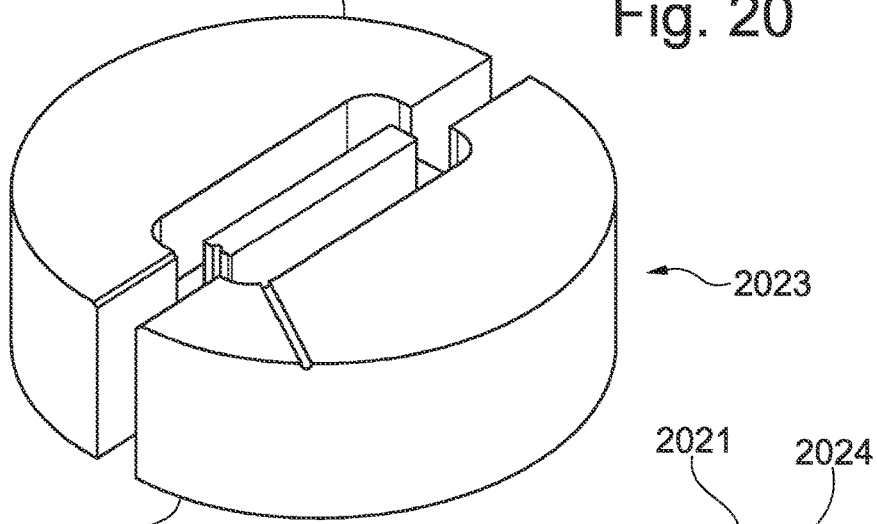
Figure 22:
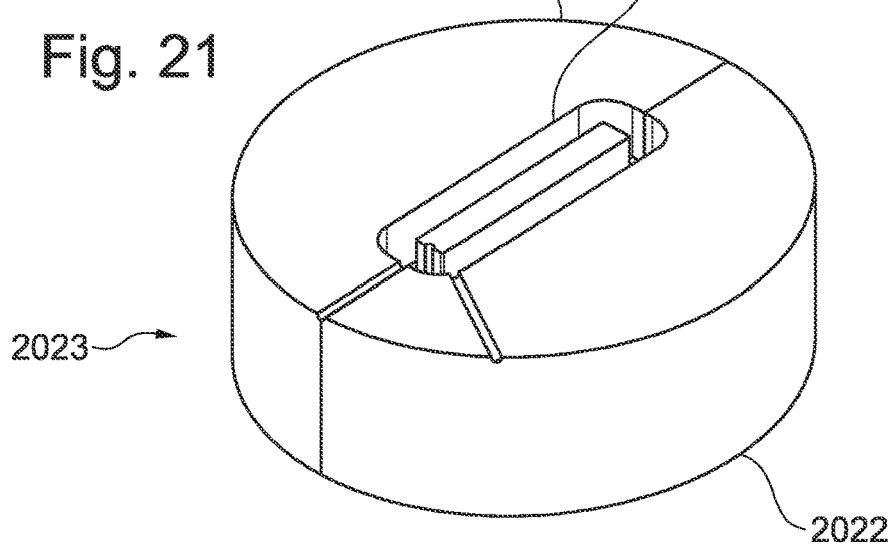

In an alternative embodiment, the die may be a "split die" formed from two separate portions as shown in FIG. 20. The die 2023 is substantially the same as the die 123 described in relation to FIG. 1*d* or FIG. 16 except that it includes two co-operating portions or separate halves 2021, 2022. The two halves 2021, 2022 are shaped such that as they are brought together as shown in FIGS. 21 and 22, they can encompass a bobbin 2001, wound wire 2025 and punch top (not shown). As can be seen from FIG. 22, in an assembled configuration the split die is substantially the same as the die 123 in FIG. 1*d*, having a through-hole 2024 for accommodating a bobbin, punch top and wound wire.

The two halves can be held together in the correct alignment by any suitable method, for example with bolts or straps or hydraulically, prior to compressing the coil. This split die arrangement allows a slight lateral pre-press or compression of the coil (wound wire) prior to compressing the coil in the longitudinal direction. The split die can help facilitating insertion of the uncompressed coil into the die and can also help with easier removal of the compressed coil from the die.

The split die 2023 of FIGS. 20 to 22 may be used in conjunction with any of the punch tops and bobbins described herein.

Rather than applying pressure to the punch top during the compression stages, pressure may optionally be applied to the punch top and/or the flange of the bobbin.

Although in the example above, the coil is wound beginning at the first end of the spindle adjacent to the flange as described in relation to FIG. 3 as, it will be appreciate that the coil may alternatively be wound starting at the second end of the spindle furthest from the flange.

Although in some embodiments above the punch top is located over the second end of the spindle of the bobbin prior to inserting the bobbin and wound wire in the die, the punch top may alternatively be located over the second end of the spindle after the bobbin and wound wire has been inserted in the die. It will be appreciated that where necessary any lead sections of the wire should be located within respective grooves of the punch top simultaneously to placing the punch top over the bobbin so that they do not become trapped within the die.

Optionally a sacrificial insert may be located between the coil and flange and/or between the coil and punch top prior to compression, or between compression stages. The insert may be formed from a suitable plastic and may be approximately 2 mm thick, for example. The cross-sectional size and shape of the insert should be substantially the same as the cross-sectional size and shape of the flange of the bobbin and the punch top. The sacrificial inserts help to prevent damage to the coil and the lead sections of the wire during compression.

In another embodiment, the grooves in the bobbin, punch and die are oversized in relation to the cross-section of the wire such that there is approximately 50 μm clearance between the wire and the groove when the wire is located within the groove.

In an alternative embodiment, rather than using a separate die, the punch top itself may also act as a die. For example, the punch top may include side walls extending longitudinally, shaped to encompass the wound wire during compression.

Although the method of manufacture described above uses a single insulated wire, a stranded wire (e.g. litz wire) may also be used to form the coil. A stranded wire includes a plurality of insulated wires and these may or may not be woven together in a known manner.

With the above-described arrangements there is the advantage that the wire terminations (lead section) can be protected from damage throughout each stage of the manufacturing process of the compressed coil.

The above-described arrangements also provide the advantage that the central section of a wire forming a coil can be compressed without also compressing the lead sections of the wire (wire terminations). This is because the wire terminations can be exited from the bobbin, punch and die assembly thereby allowing just the central portion of the wire forming the coil to be compressed.

The wire terminations do not have to be compressed with the coil. In previously known devices, compressing the wire terminations with the coil requires the terminations to be bent back from the coil. This can damage the wire terminations and can also leave voids in the coil, thereby reducing the fill factor. The method of manufacture described above eliminates the need to compress the wire terminations with the coil and therefore produces a coil with a higher fill factor than conventional techniques.

The above described system of a bobbin, punch and die, along with the particular method of winding described in relation to FIG. 3, provides the advantage that multiple identical (or very nearly identical) coils can be produced by repeating the manufacturing steps.

The above described bobbin having discrete separable flange and spindle has the advantage that the compressed coil may be more easily removed from the bobbin. This bobbin may be particularly advantageous where the lead sections of the wire are located in grooves in the flange of the bobbin.

It will be clear to a person skilled in the art that features described in relation to any of the embodiments described above can be applicable interchangeably between the different embodiments. The embodiments described above are examples to illustrate various features of the invention. Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a compressed coil, the method comprising:
   providing a wire comprising a first lead section, a central section and a second lead section;
   winding the central section of the wire around a bobbin to form a coil;
   locating a punch top over an end of the bobbin such that the end of the bobbin is located at least partially within a through-hole of the punch top;
   locating the first lead section of the wire in a groove of the bobbin or in a groove in a surface of the through-hole of the punch top;
   locating the second lead section of the wire within a groove in a surface of the punch top or bobbin;
   locating the bobbin, coil and punch top within a die; and
   applying pressure to the bobbin and/or punch top to compress the coil coil, wherein the die is configured to prevent the coil from bulging outwardly during the compression.

2. A method as claimed in claim 1 comprising locating the second lead section of the wire within a groove in an outer surface of the punch top or bobbin.

3. A method as claimed in claim 1 comprising winding the central section of the wire around a spindle of the bobbin, wherein the bobbin comprises a flange at a first end of the spindle.

4. A method as claimed in claim 3, wherein the spindle and the flange are discrete, separable parts.

5. A method as claimed in claim 3, wherein the groove of the bobbin is a longitudinal groove in an outer surface of the spindle.

6. A method as claimed in claim 3, wherein the groove of the bobbin extends from an inner edge of the flange adjacent the first end of the spindle to an outer edge of the flange and then longitudinally along an outer surface of the flange.

7. A method as claimed in claim 3, wherein the end of the bobbin located at least partially within the through-hole of the punch top is a second end of the spindle.

8. A method as claimed in claim 1 further comprising winding the central section of the wire in a configuration such that the first and second lead sections of the wire can exit the bobbin and/or the punch top.

9. A method as claimed in claim 1, further comprising locating a portion of the first lead section of the wire within a groove in a surface of the punch top.

10. A method as claimed in claim 1, further comprising locating a portion of the first and second lead sections of the wire within respective grooves in one or more surfaces of the die.

11. A method as claimed in claim 1, further comprising locating at least one insert between the coil and the punch top and/or between the coil and the flange.

12. A method as claimed in claim 1, wherein the die comprises two co-operating portions configured to be joined together to accommodate the bobbin, coil and punch top.

13. A method as claimed in claim 1, wherein the step of winding comprises winding the central section of the wire around the bobbin such that the coil comprises multiple layers of windings.

14. A method as claimed in claim 1, wherein the step of winding comprises winding the central section of the wire in a configuration to minimise void areas between windings.

15. A method as claimed in claim 13, wherein the multiple layers of windings comprise an innermost layer adjacent a spindle of the bobbin, a second layer provided adjacent the innermost layer and subsequent layers provided adjacent the second layer, and each winding of each of the second and subsequent layers is wound offset from each winding of adjacent layers.

16. A method as claimed in claim 1, wherein the wire is stranded wire or litz wire.

17. A system suitable for holding a wire during the manufacture of a compressed coil, the system comprising:
   a bobbin for holding a wound wire forming a coil; and
   a punch top comprising a through-hole, the through-hole having a cross-section sized and shaped to accommodate at least a portion of an end of the bobbin, such that application of pressure to the bobbin and/or punch top compresses the coil held by the bobbin; and
   a die having a through-hole sized and shaped to accommodate the bobbin, coil and punch top, the die configured to prevent the coil from bulging outwardly during compression;
   wherein the bobbin or punch top comprises a groove in a surface thereof for accommodating a first lead section of the wound wire, and
   wherein the bobbin or punch top comprises a groove in a surface thereof for accommodating a second lead section of the wound wire.

18. A system as claimed in claim 17, wherein the groove for accommodating the second lead section of the wire is in an outer surface of the punch top or bobbin.

19. A system as claimed in claim 17, wherein the bobbin comprises a spindle, and a flange at a first end of the spindle.

20. A system as claimed in claim 19, wherein the spindle and the flange are discrete, separable parts.

21. A system as claimed in claim 19, wherein the groove for accommodating the first lead section of the wire is located in an outer surface of the spindle.

22. A system as claimed in claim 19, wherein the bobbin groove for accommodating the first lead section of wire extends laterally along the flange from an inner edge to an outer edge thereof and then longitudinally along an outer surface thereof.

23. A system as claimed in claim 17, wherein the die further comprises two grooves extending along a surface of the die to accommodate the lead sections of the wire.

24. A system as claimed in claim 17, wherein the die comprises two co-operating portions configured to be joined together to accommodate the bobbin, coil and punch top.

* * * * *